US008441167B2

(12) United States Patent
Verkoglyad et al.

(10) Patent No.: US 8,441,167 B2
(45) Date of Patent: May 14, 2013

(54) CAPACITIVE ELECTRIC CURRENT GENERATOR

(76) Inventors: Alexander Grigorievich Verkoglyad, Novosibirsk (RU); Alexander Gueroguievich Kvashnin, Novoslbirsk (RU); Sergey Nikolaevich Makarov, Novosibirsk (RU); Sergey Kuzmich Golushko, Novosibirsk (RU); Vladimir Ivanovich Merkulov, Novosibirsk (RU)

( * ) Notice: Subject to any disclaimer, the term of this patent is extended or adjusted under 35 U.S.C. 154(b) by 484 days.

(21) Appl. No.: 12/669,492

(22) PCT Filed: Jul. 11, 2008

(86) PCT No.: PCT/RU2008/000457
§ 371 (c)(1),
(2), (4) Date: Apr. 15, 2010

(87) PCT Pub. No.: WO2009/011614
PCT Pub. Date: Jan. 22, 2009

(65) Prior Publication Data
US 2010/0194236 A1 Aug. 5, 2010

(30) Foreign Application Priority Data
Jul. 17, 2007 (RU) .................................. 2007127122

(51) Int. Cl.
*H02N 1/00* (2006.01)
(52) U.S. Cl.
USPC ........................................................ 310/309

(58) Field of Classification Search .................. 310/309, 310/339, 308
See application file for complete search history.

(56) References Cited

U.S. PATENT DOCUMENTS

| 2,840,729 | A | 6/1958 | Kreuthmeir |
| 3,210,643 | A | 10/1965 | Else et al. |
| 4,127,804 | A | 11/1978 | Breaux |
| 7,615,970 | B1 * | 11/2009 | Gimlan .......................... 320/166 |
| 2004/4207369 | | 10/2004 | Landolt |

OTHER PUBLICATIONS

International Search Report dated Jul. 2, 2009.

* cited by examiner

*Primary Examiner* — Dang Lee
(74) *Attorney, Agent, or Firm* — Antonio Papageorgiou; Ostrow Kaufman LLP

(57) ABSTRACT

A capacitive generator has a generator circuit (G) and a charge priming circuit (P) that includes variable capacitors (1, 2, 101, 102) all coupled to a mechanical transmission which acts to vary the capacitance of the capacitors and to actuate an array of switches (K). A small residual charge on the priming circuit (P) can thus be amplified and conveyed to the generating circuit (G) where it is used to generate an alternating current between the variable capacitors (1, 2) of the generating circuit. The capacitance of the generating capacitors (1, 2) is varied in antiphase in response to the movement of the transmission. An electrical energy extraction device (8) in circuit with the generator capacitors (1, 2) extracts electrical energy from the circuit in reaction to the alternating current which can then be used to power or recharge a small portable device.

19 Claims, 15 Drawing Sheets

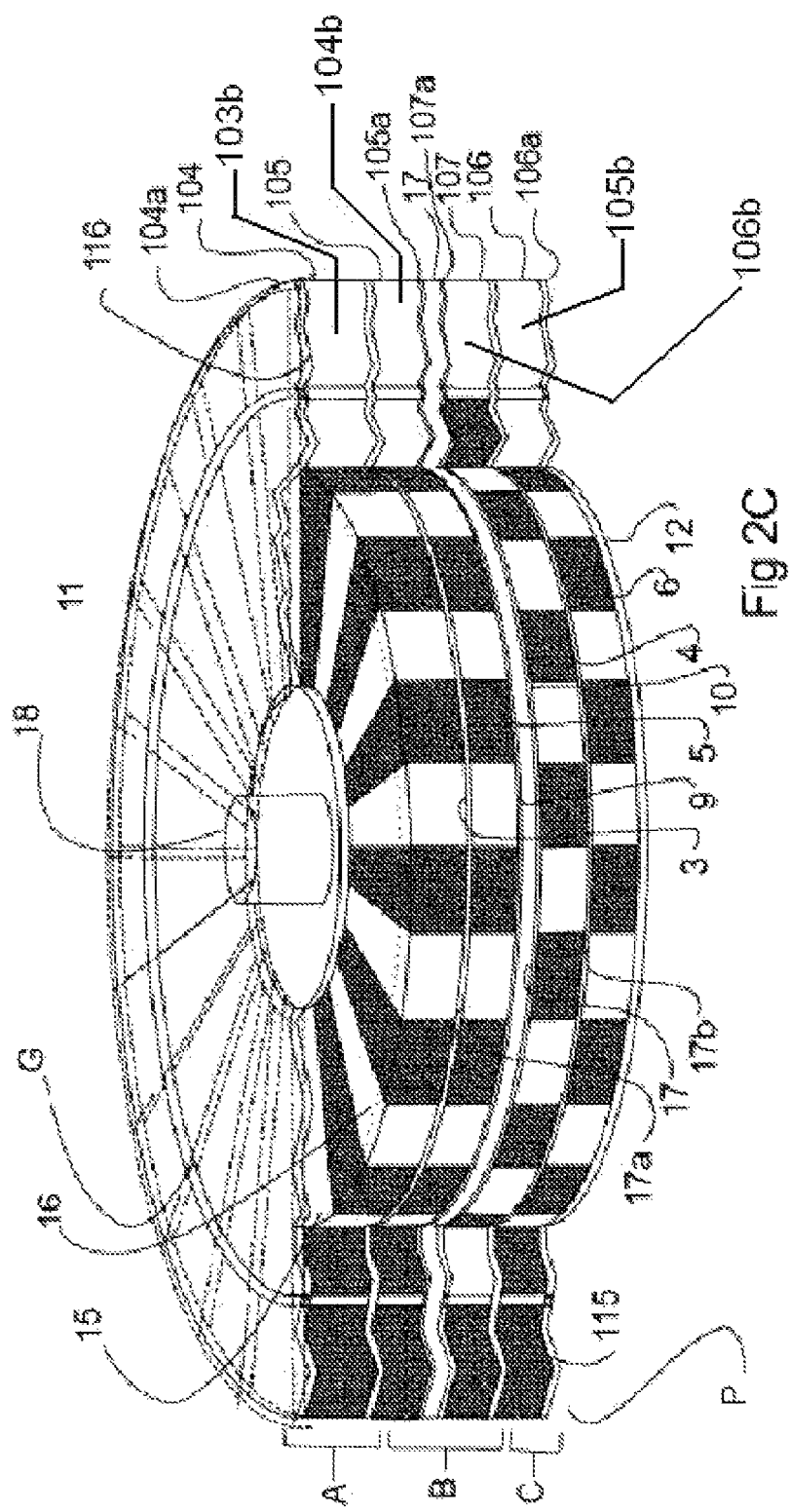

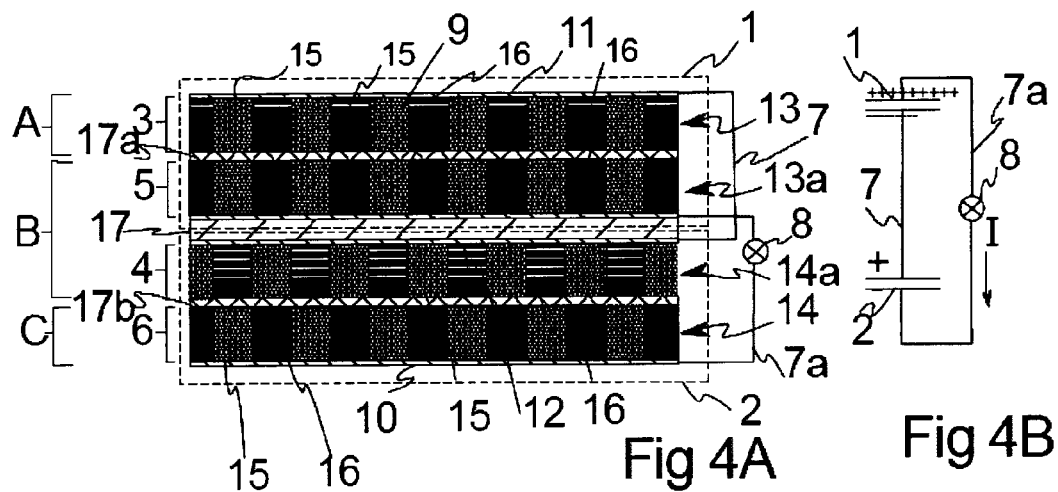
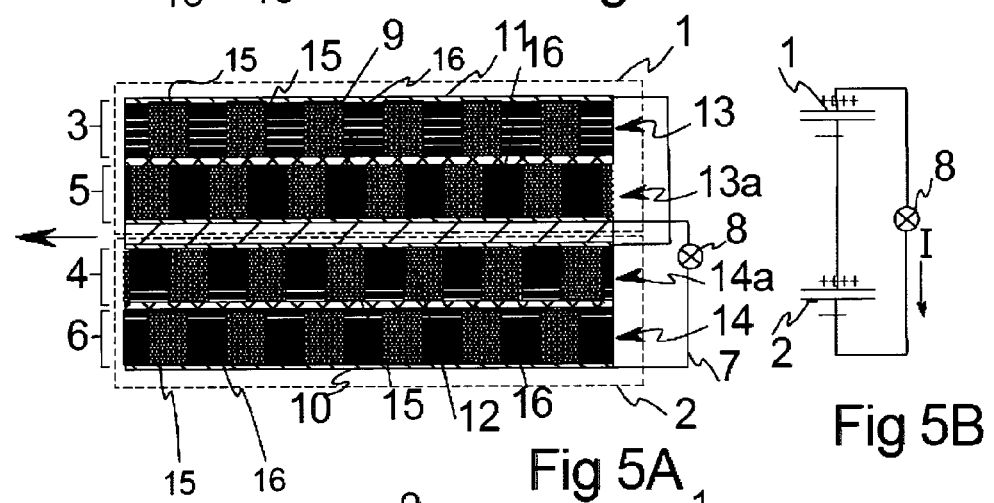
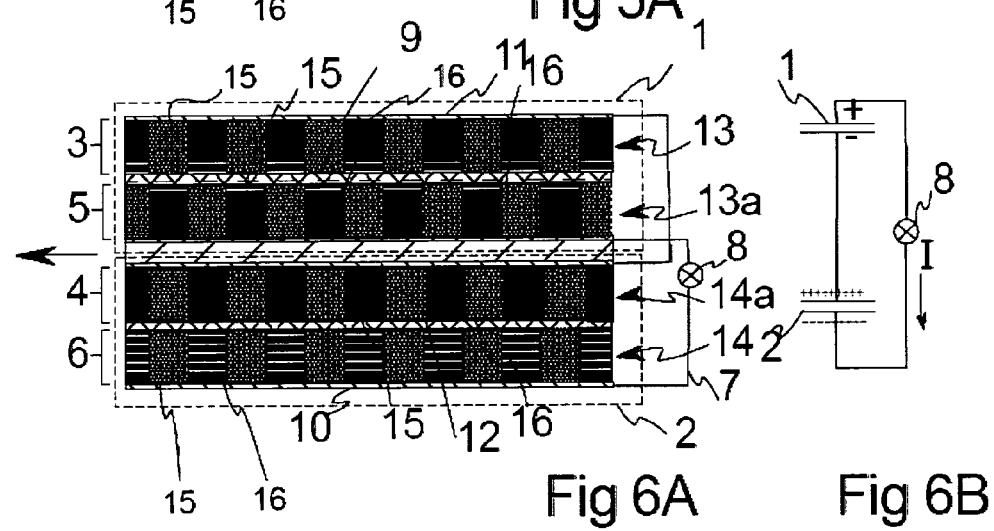

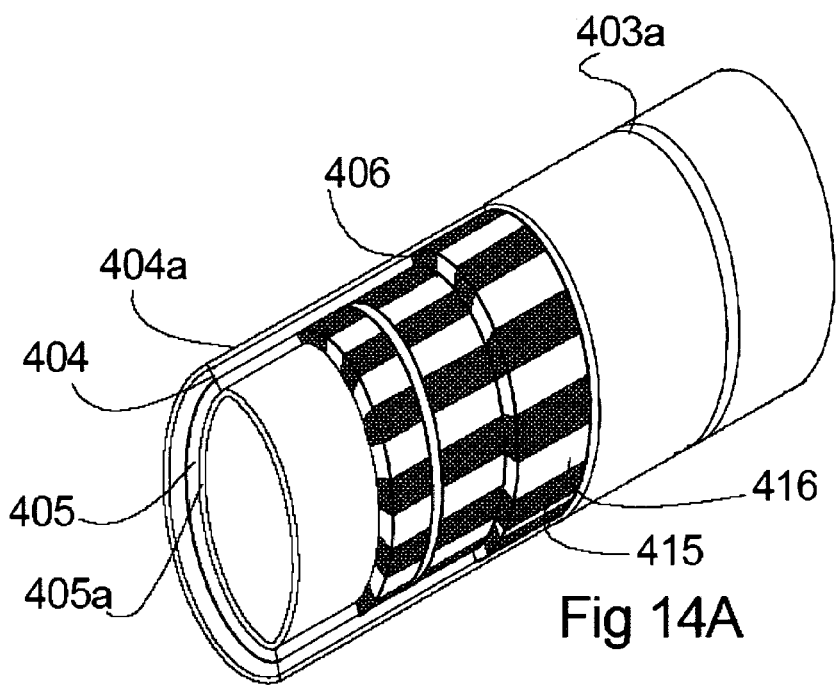
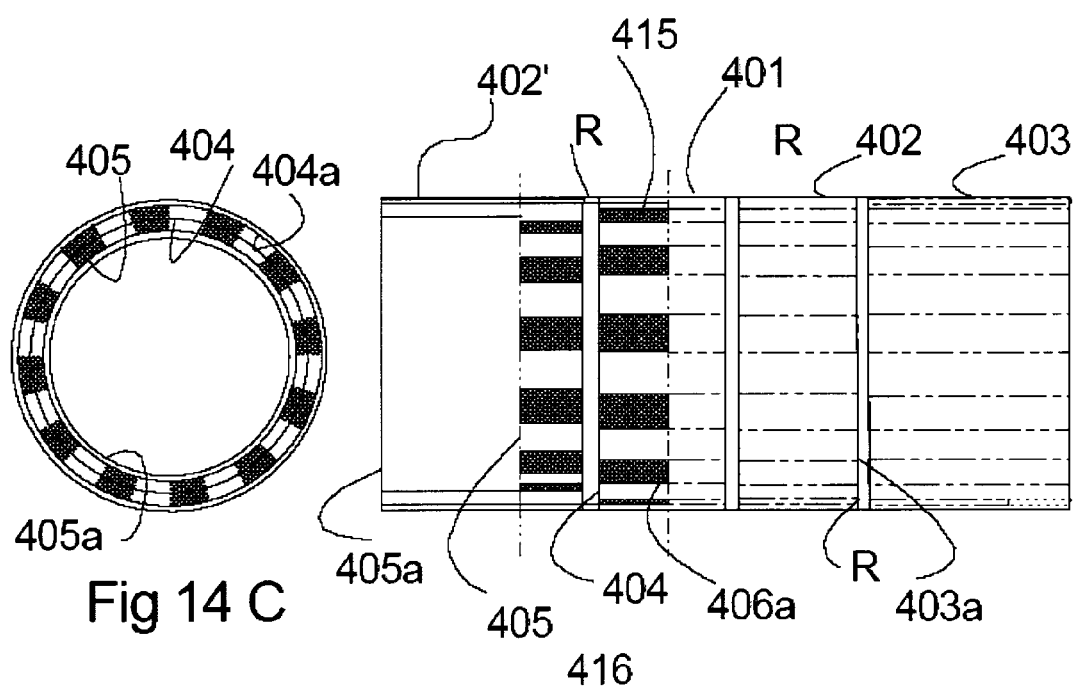

CAPACITIVE ELECTRIC CURRENT GENERATOR

This application is a National Phase entry of PCT International Application, Serial No. PCT/RU2008/000457, filed Jul. 11, 2008, which claims priority to Russian Federation (RU) Application No. 2007127122, filed Jul. 17, 2007, which are each incorporated herein by reference.

TECHNICAL FIELD

The present invention is concerned primarily with the design and operation of a low cost, miniature portable capacitive electric current generator able to generate useful amounts of electric current in response to incidental movements of a part of a device such as the flip of a cellphone. The generator is envisaged as being especially useful in supporting the power supply to portable electronic devices, such as mobile phones, personal digital assistants, global positioning systems, MP3 players, personal and/or implanted medical devices and so on. It should be understood that the application of the generator is potentially to any small, miniature device requiring an electric charge to operate and is not to be limited to the examples given above. The generator of the invention aims to serve devices with average power consumption of the order of 0.1 W to 4 W and peak consumption of 10 W may be served by the generator, however devices of larger or smaller power consumption may be served.

As the cost, size and performance of electronic, particularly data-processing devices improves they are becoming increasingly ubiquitous and are likely in future to appear in almost every man-made product. At present most portable scale electronic devices rely upon chemical cells of rechargeable or single use type to store and deliver electrical power on demand. However, such chemical cells or batteries require replacement from time to time, and in the case of rechargeable cells, onerously frequent recharging as well. Most forms of rechargeable cells sufficiently compact for use in small electronic devices self discharge significantly over periods of time measured in days or weeks making them ill suited for use in occasionally used devices.

It has previously been noted that one potential source of energy capable of supplying at least a part of the power demands of the miniature electronic devices mentioned above is human muscle power. Historically, the everyday motions of a moving wrist have been used to wind the spring of a wristwatch. Some researchers have sought to use similar mechanisms to move conductors through a magnetic field in order to generate electricity for storage in cells for electrical devices.

An alternative mechanism for electrical charge generation from a mechanical motion is the generation of an electric field in a capacitor which is then varied by means of a mechanical movement of part of the generator in order to induce charge to move through a conductor. An early example of such an electrostatic capacitive generator is described in the U.S. Pat. No. 4,127,804. In the generator described here two variable capacitors are mounted on a common shaft. Each plate of each capacitor is a segment of a disk. One plate of each of the variable capacitors is mounted as a rotor on the shaft while the other plate is mounted as a stator. The arrangement of each of the capacitors is such that as the shaft rotates the distance between the plates of each capacitor changes so that their respective capacitance varies in anti-phase, one rising to a maximum as the other falls to a minimum. The respective capacitor plates are electrically connected by a conductor via a load. Initially a priming charge must be loaded onto one of the capacitors. Any mechanical force causing the driveshaft to rotate will cause the capacity of the charged capacitor to fall while the capacity of the uncharged capacitor rises, charge will therefore flow reciprocally between the capacitors as an alternating current. The flow of alternating current can be used to induce a charge onto an accumulator such as a chemical storage cell for later use.

The device described in U.S. Pat. No. 4,127,804 suffers from unsatisfactory overall and volumetric efficiency and suffers a serious flaw in that the priming charge will, over a fairly brief time discharge. For the avoidance of doubt "volumetric efficiency" is an expression relating the useful energy output by a generator to the energy input and the volume of the generator. Once discharged, the priming charge must be replaced or the generator will not work at all.

U.S. Pat. No. 4,897,592 discloses a device in principle similar to that of U.S. Pat. No. 4,127,804 which also has unsatisfactory volumetric and overall efficiency, but addresses the problem of the priming charge discharging by the somewhat unsatisfactory suggestion that the electrostatic priming charge be applied to the capacitor plates of the generator by an external energy source such as a battery.

In an effort to circumvent the priming charge problem more recent development has focused on electret based device. One example of an electret based device is described in US 2004/0207369. Such devices are different from capacitance-based devices in that the electret is a component formed of a material which permanently stores an electrostatic charge applied to it during the production process. This charge cannot leave the electret but is used to induce a movement of charge by moving the electret relative to two nearby electrodes. Thus electret-based generators overcome one of the principal disadvantage of capacitance-based generators. Unfortunately electrets are prohibitively expensive and so uneconomic for most applications. Furthermore, the charge density of electret generators is significantly less good than that for capacitor based generators so that electret based generators cannot achieve similar high overall or volumetric efficiencies.

According to a first aspect of the present invention there is provided a capacitive electric current generator wherein:
  a capacitive generating circuit is arranged to be responsive to a force from a transmission to generate an electric current; and,
  a priming charge circuit comprising at least two priming capacitors coupled with the transmission so that their capacitance varies and electrically connected to the capacitive generating circuit to generate and deliver a priming charge to the capacitive generating circuit.

According to a second aspect of the present invention there is provided a generator having:
  at least two variable capacitors, each of said capacitors comprise a pair of conductive layers separated by a variable dielectric,
  an electrical energy extraction device connected between a conductive layer of one capacitor plate of one of said variable capacitors and a conductive layer of the other of said capacitors,
  a transmission coupled to vary the capacity of each capacitor, in response to a force from an external source, so that, as one capacitance increases the other decreases, with a constant distance between the conductive layers, whereby,
  when a priming electric charge is stored on the capacitors the priming charge is conducted through the electrical energy extraction device to extract electrical energy.

According to a third aspect of the present invention there is provided a generator having:

at least two variable capacitors, each comprising a mobile plate and a stator plate, each plate comprises a conductive layer and a dielectric layer lying between the confronting faces of the plates, one of the conductive layers of each of said capacitors is electrically connected to an electrical energy extraction device, each capacitor is coupled to a mechanical transmission which varies the capacity of each capacitor, in response to a motivating force from an external source, by moving the mobile plates of each capacitor relative to the stator plates whereby, when a priming electric charge is stored on the capacitors the priming charge is conducted through the electrical energy extraction device to extract electrical energy characterized in that the shape of the layers of each capacitor is such that the dielectric between the plates varies to change the capacitance when the mobile plate is moved with respect to the stator plate.

According to a fourth aspect of the present invention there is provided a variable capacitor for use in a generator comprising a pair of opposing conductive layers fixed such that the distance between the conductive layers is constant and separated by a dielectric layer having a permittivity which can be varied in response to a force.

The permittivity of the dielectric may be varied by having at least two overlying layers of dielectric, each formed of regions of dielectric of different permittivity arranged across their confronting surfaces. One dielectric is mounted to be displaced relative to the other so that regions of high permittivity coincide on each plate in one position and regions of high and low permittivity on opposing plates coincide in another position. Thus the overall value of permittivity of the dielectric can change from a high value to a low value, so changing the capacitance of the capacitor. Relative movement of the dielectric layer can readily be achieved by a transmission which may displace the dielectric linearly or rotationally. Displacement is preferably parallel to or tangential to the layer. Preferably the displacement is achieved without changing the volume of the capacitor.

The capacitance of the capacitors may be varied synchronously and/or in antiphase to effect the change in capacitance.

The mechanical transmission may be coupled to structures of the portable device such as a push button, sliding cover or flip open cover, a hinge or a squeezable handle, so that the muscular effort of, for example, opening the device for use, drives the generator. The generator may be implemented as a stand alone device for delivering charge to other devices. The generator may be implemented into the a shoe to recover power from the action of a wearer walking.

Additional preferred and optional features of the present invention are described in the dependent claims.

BRIEF DESCRIPTION OF THE DRAWINGS

An embodiment of a generator constructed in accordance with the present invention, will now be described, by way of example only, with reference to the accompanying drawings, in which:

FIG. 2C is a further perspective cutaway drawing showing further internal details of the first embodiment, FIG. 4A is a diagrammatic sectional side elevation on the line IV(A)-IV(A) viewed in the direction of the arrows in FIG. 3A showing a segment of a generator of the first embodiment in an initial primed state, FIG. 4B is a circuit diagram of the generator of FIG. 4A showing the charge condition of the capacitors in the initial primed state, FIG. 5A is a diagrammatic sectional side elevation on the line IV(A)-IV(A) of FIG. 3A showing the segment of the variable capacitor in a charge displacement phase approximately 90 degrees through the cycle, FIG. 5B is a circuit diagram illustrating the charge states of the capacitors in the charge displacement phase of FIG. 5A, FIG. 6A is a diagrammatic sectional side elevation on the line IV(A)-IV(A) of FIG. 3A showing the segment of a variable capacitor at the end of one charge displacement phase, that is to say 180° through the process cycle, FIG. 6B is a circuit diagram illustrating the charge state of the capacitors in FIG. 6A.

FIGS. 14A, 14B and 14C is a fourth possible embodiment of the present invention.

DETAILED DESCRIPTION OF THE EMBODIMENTS

Figure 1:
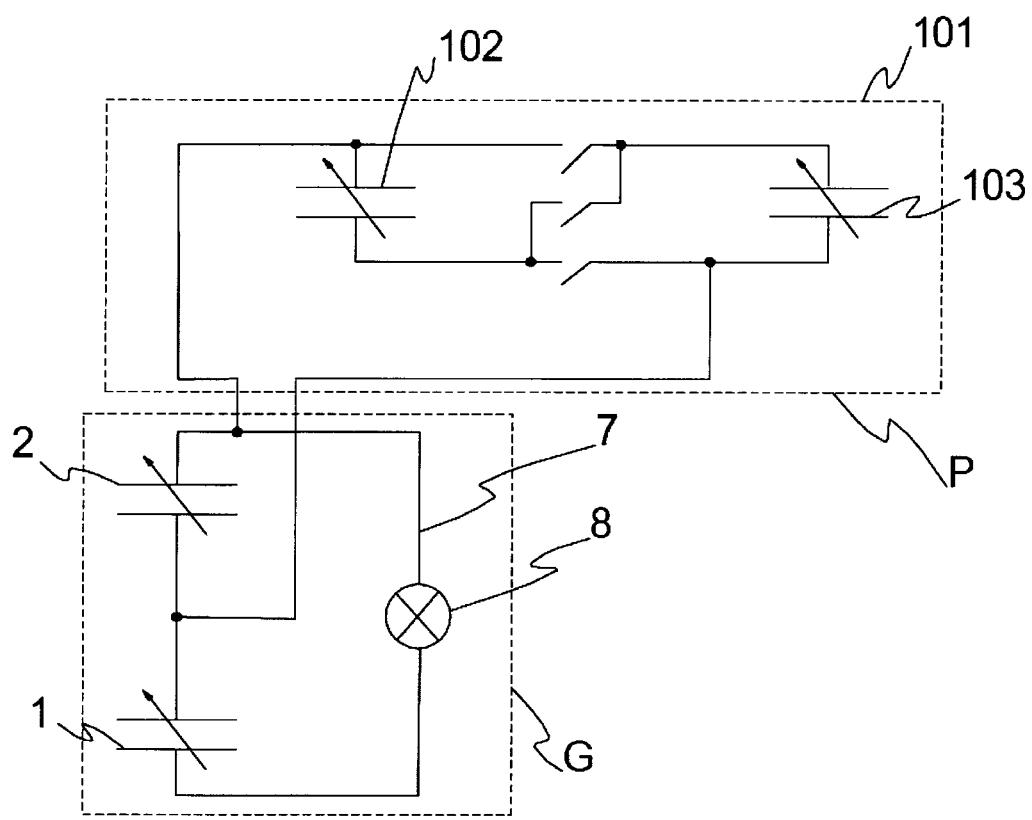
FIG. 1 it is a circuit diagram illustrating the electrical connections of a generator including a generator circuit and a priming circuit.

FIG. 1 is the electric circuit diagram for a generator of the present invention, this consists of a variable first capacitor 1 and a variable second capacitor 2. As can best be seen in FIG. 2A the generator consists of three discs A, B and C coaxially mounted around a driveshaft 18.

Disc B is mounted between discs A and B coupled to the driveshaft 18 for rotation, while the upper and lower discs A and C are irrotatably mounted in relation to the driveshaft and the disc B.

Figure 2A:
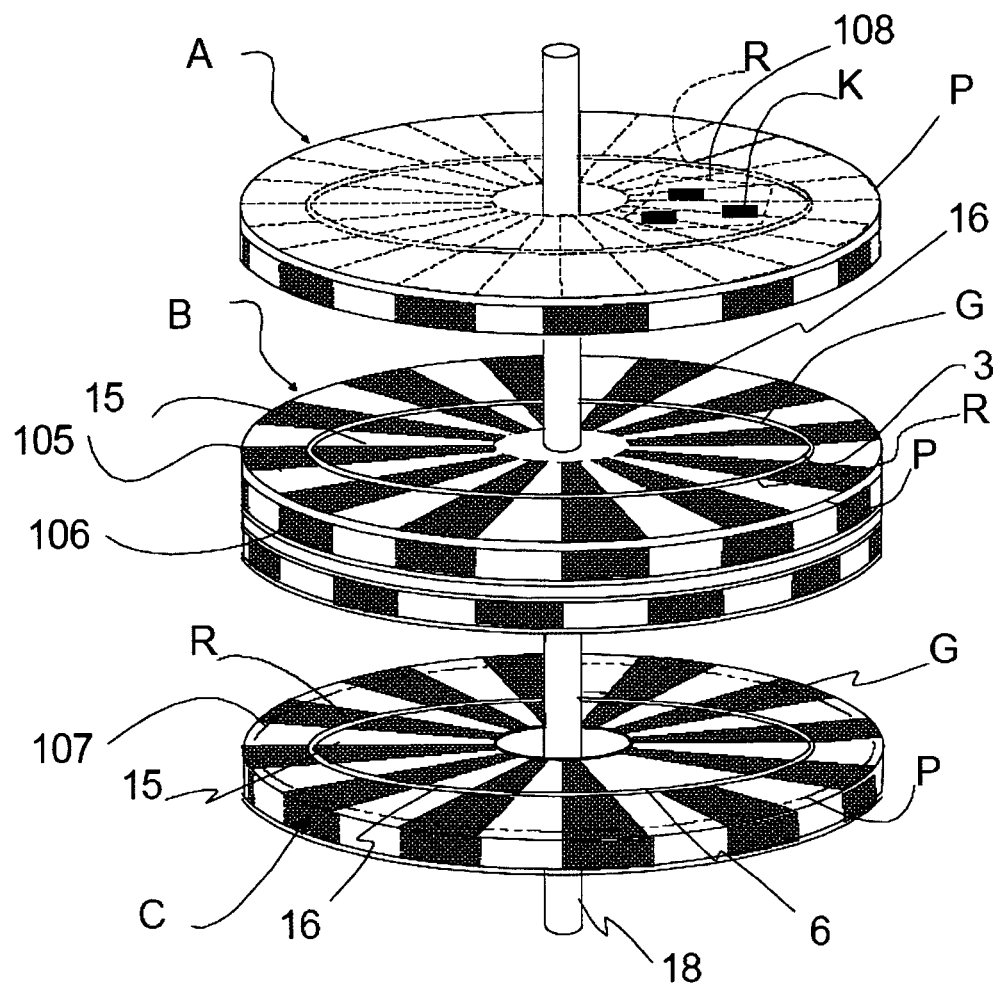
FIG. 2A is an exploded perspective diagram illustrating a first embodiment of the generator.
Figure 2B:
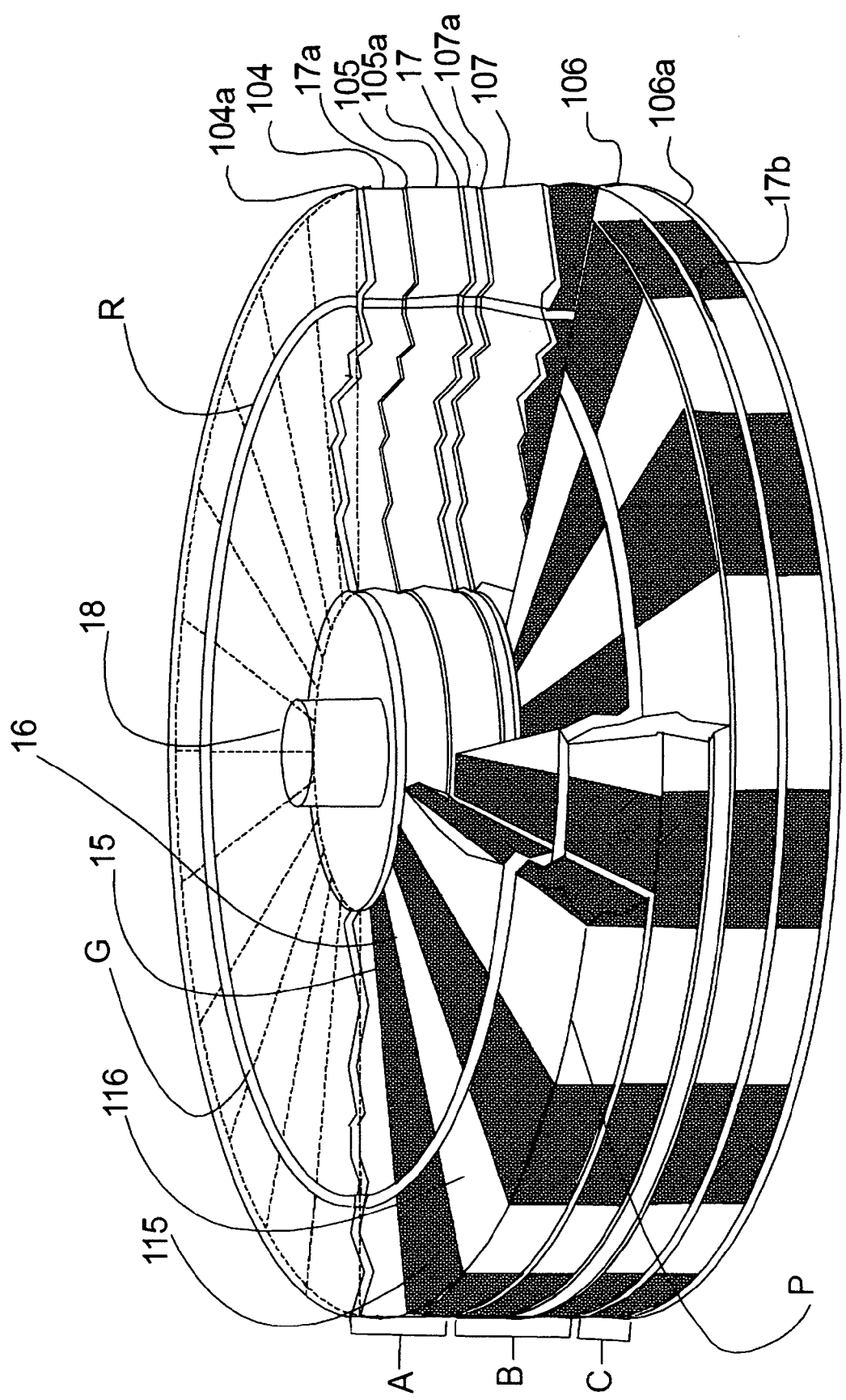
FIG. 2B is a perspective cutaway assembly drawing of the generator of FIG. 2A.
Figure 2D:
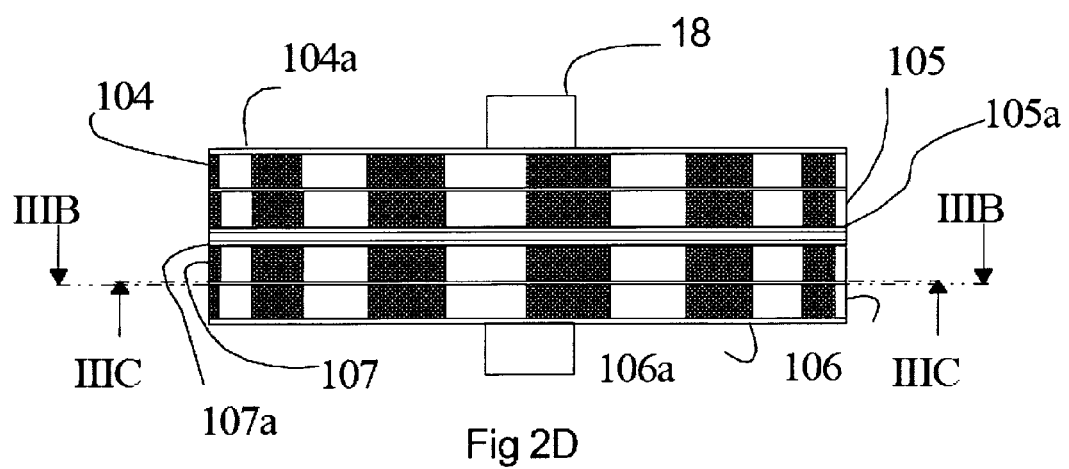
FIG. 2D is a side elevation of the first embodiment.

It can be seen from FIG. 2A that each disc is divided into an inner annulus marked as G, and an outer annulus marked P. Rings R electrically isolate the annuli. As will be described below the inner region provides the generating circuit G, while the outer annular regions of the discs provide a self priming circuit P.

Figure 3A:
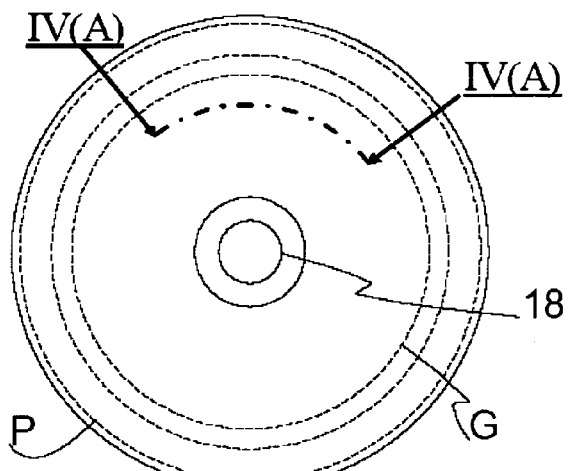
FIG. 3A is a plan view of the first embodiment.

FIG. 3A is a plan view of the assembled generator from above in FIG. 2A. The lower face of discs A and the upper face of disc B are similar.

Figure 3B:
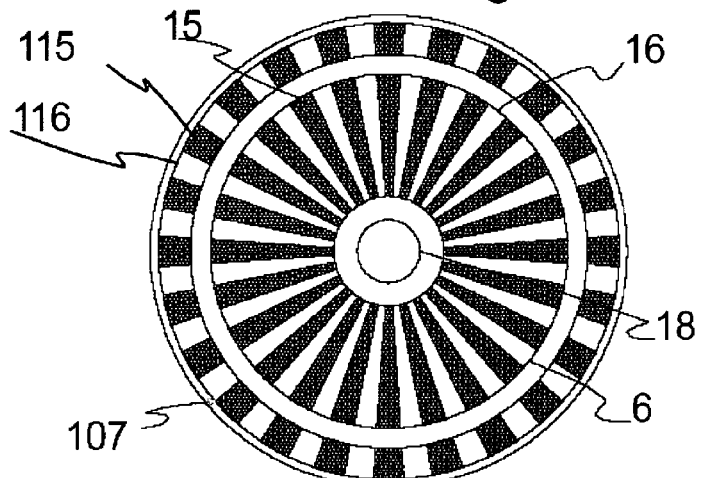
FIG. 3B is a diagrammatic plan view of a stator plate of one variable capacitor of the generator of FIG. 2A viewed as on the line IIIB-IIIB.
Figure 3C:
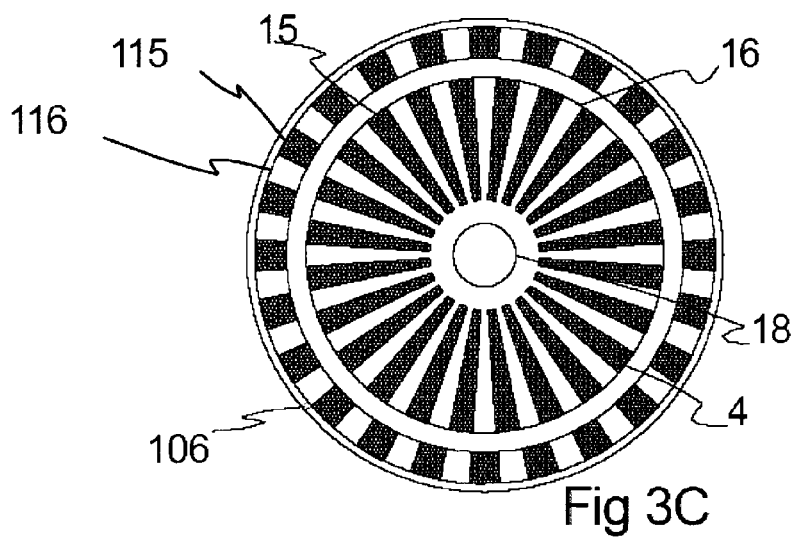
FIG. 3C is a plan view of a rotor plate of one variable capacitor of the generator of FIG. 2A viewed as on the line IIIC-IIIC.

FIG. 3B shows the upper face of disc C in plan. FIG. 3C illustrate the lower face of the disc B which is obscured in FIG. 2A.

As shown structurally in FIGS. 2A to 2D and more functionally in FIGS. 4A, 5A and 6A the variable capacitors 1, 2 each comprise two opposing annular plates. The first capacitor 1 comprises opposing plates 3 and 5 while the second capacitor 2 comprises opposing plates 4 and 6. The plate 3 is provided on the disc A in FIG. 2 the plates 4 and 5 on the disc B and the plate 6 on the disc C. Each of the opposing plates 3, 4, 5, 6 consists of a layer of electrical conductor 9, 10, 11, 12 and a dielectric layer 13, 14, 13a, 14a is bonded one each to each conductive layer 9, 10, 11, 12 to prevent electrical charge from crossing the gap separating the plates while remaining to some degree pervious to the electric field.

Each dielectric layer 13, 13a, 14, 14a is divided into regions 15 (shown in crosshatch) having a low dielectric permittivity and regions 16 (shown clear) having high dielectric permittivity. As can be seen from FIGS. 3B and 3C the regions of high and low permittivity extend radially, as segments of similar size, from an inner annulus near the centre of the disk to an annulus toward the rim of the disc. It will be noted that the regions of high and low permittivity on plate 4 are rotated relative to the other plates 3, 5 and 6 which all resemble FIG. 3B.

Because the variable capacitor uses confronting layers of dielectric material, the maximum dielectric permittivity of the layer can be very high by comparison with air. actual values will depend on the dielectric selected.

Each of the plates 3, 4, 5, 6 is mounted coaxially around a transmission provided by the driveshaft 18.

Rotor plates, one each for each capacitor are provided by mounting one of the plates 5, 4 of each capacitor 1, 2 on the driveshaft 18 to be relatively rotatable with respect to each of the stator plates 3, 6. It can be readily understood from this arrangement that as the rotor plates 4,5 turn the regions of high dielectric permittivity 15 of the opposing plates of each capacitor 1, 2 alternately align themselves in opposition, as shown in the capacitor 1 of FIG. 4A and then adjacent as shown in the capacitor 2. The alignment of the rotor plates of the capacitors 1, 2 is as shown in FIG. 4A such that when one rotor plate has its dielectric regions fully aligned in opposition, the other has its dielectric regions fully adjacent. The result of this arrangement is that the permittivity of the dielectric layers between the conductor layers of each capacitor varies cyclically from a maximum to a minimum value as the plates 4, 5 are rotated. The maximum value of permittivity being achieved when regions of similar dielectric permittivity are in opposition. By virtue of this arrangement the capacitance of each capacitor 1, 2 varies in antiphase.

The difference in permittivity of the regions 15, 16 can be achieved either by the deposition of materials of different permittivity onto the conductive layer, or by different treatment of a single dielectric layer over the regions to induce a desired change in the dielectric properties. The plates of the capacitor may thus be fabricated by known processes such as printing or plasma deposition onto a suitable substrate.

A spacer or bearing member 17a, 17b may be provided between the opposing faces of the dielectric layers.

Each the conductive layer 10, 11 of each stator plate 3,6 communicates via a conductor 7, 7a with the conductive layer 9, 12 of the rotor plate 5, 4 of the other of the capacitors. Thus the conductor layer 11 of the plate 3 communicates with the conductive layer 12 of the rotor plate 4 via conductor 7 while the conductive layer 9 communicates with the conductive layer 10 via the conductor 6A.

As shown in FIG. 4B when a charge is loaded onto the first generator capacitor 1 so that, in this case, the plate 5 achieves a relatively positive charge, the opposing plate 3 achieves a corresponding negative charge. When a torque, is applied to rotate the driveshaft 18, the rotor plates 3 and 4 rotate altering the relative alignment of the dielectric regions 15 and 16 of each respective opposing plate. In consequence the capacitance of the capacitor 1 falls from its maximum value while the capacitance of the capacitor 2 rises from its minimum value. As illustrated in FIGS. 5A and 5B the consequence is that the charge is displaced from the capacitor 1 through the conductor 7a towards the capacitor 2 through an energy extraction device 8 as current I.

The energy extraction device is a load, for example a transformer.

As the current flows through the energy extraction device 8 electrical energy is drawn off, without discharging the priming charge Q, and may then be used as desired. For example, the energy may charge a chemical cell or some other form of accumulator.

It will be readily appreciated that if the process is continued the relative alignment of the regions 15, 16 illustrated in FIGS. 6A and 6B will be reached where a maximum charge is stored on the second capacitor 2 and a minimum on the first capacitor 1. This can be regarded as 180 degrees through the generation cycle. Continued rotation in either direction will cause the charge transfer to reverse towards the phase condition of the capacitors in FIGS. 4A and 4B inducing the charge to travel back through the conductor 7 to the capacitor 1 so that the energy extraction device 8 will see an alternating current.

It will be appreciated that the capacitance of each capacitor is varied without altering the distance between the conductive plates 9, 11 of the first capacitor or 10 and 12 of the second capacitor 2. The use of a dielectric layer between the conductive plates of each capacitor which has a variable permittivity allows the capacitors to store a large charge at high-voltage allowing a high energy density and correspondingly relatively higher power generation performance than hitherto possible with similar devices. The volumetric efficiency can be enhanced by polishing the confronting surfaces of the dielectric layers to a high degree and minimising the gap, which may be an air gap between them.

Capacitance is $C=C_0/[1+\in(\delta/d)]$

Where $C_0$ is capacitance of variable capacitor with no air gap between dielectric layers;

$\in$—dielectric permittivity d is thickness of dielectric layers;

δ is equal to (t−d)—air gap between dielectric layers;

t—total gap between conducting plates;

This formula is true for the condition of δ<<d. From this formula the acceptable air gap that does not bring about crucial reduction of capacitance should be $\in$ times less than thickness of dielectric.

17 refers to a rotor substrate on to which the rotor plates 4 and 5 are formed and provides electrical insulation and structural strength between the plates 4 and 5. Similar insulating and reinforcing members may be provided around the other generator components but have not been illustrated to avoid unnecessary complication.

The design of the capacitors allows the generator to be manufactured at low cost while exhibiting high performance and a high degree of reliability.

Figure 7A:
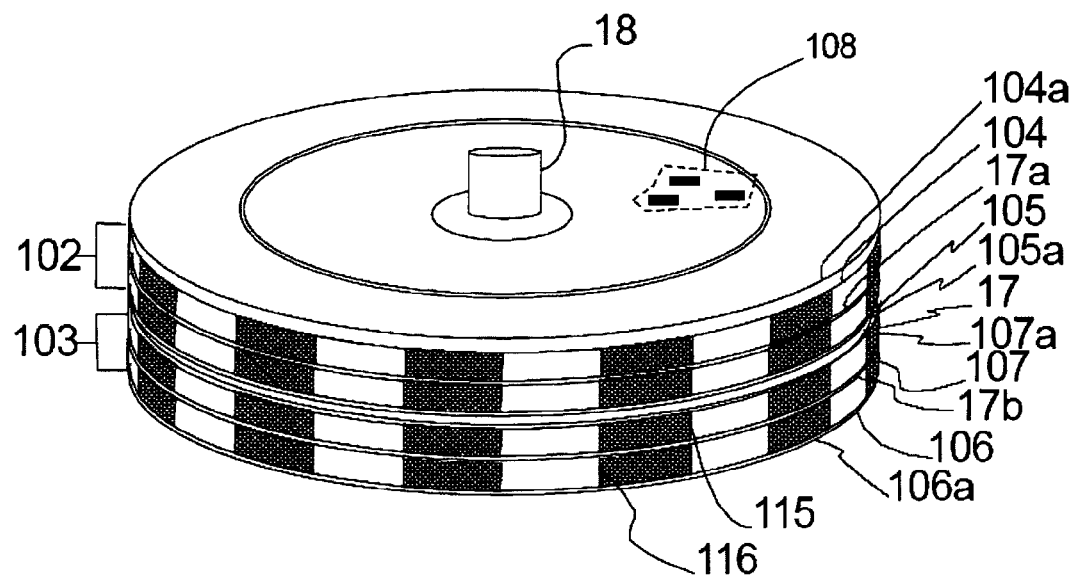
FIG. 7A is a perspective view of the generator from above showing an initial showing an initial state of the priming capacitors.
Figure 7B:
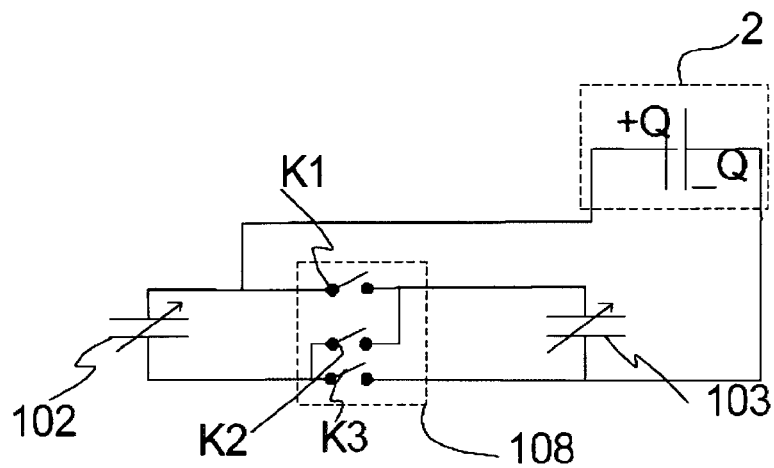
FIG. 7B is a circuit diagram of the generator showing the charge states and switch conditions of the priming capacitor circuit in the initial phase of FIG. 7A.

A problem arising with any form of capacitor-based generator is the gradual loss of the priming charge. To address this problem the generator of the present invention is provided with a self priming circuit 101 which as a consequence of movement conveyed by the transmission 18 will generate or restore the priming charge on the generator capacitors, as illustrated in FIG. 1. This circuit 101 consists of two variable priming capacitors 102, 103 of design similar to that of the generator capacitors 1 and 2. A structural drawing of the self priming capacitors is provided by FIGS. 2A, 2B and 2C. FIG. 7A illustrates the phase alignment of the capacitor plates. FIG. 7B is a circuit diagram illustrating the charge condition of each component in a first phase illustrated in FIGS. 7A and 7B.

The priming capacitors 102, 103 each consist of a pair of annular plates 104, 105, 106, 107. The plate 107 is provided on the outer annulus of stator disc C. Plates 106 and 105 are provided in back to back relation on the rotor disc B and plate 104 on the stator disc A.

Each plate 104, 105, 106, 107 is formed from a respective conductive layer 104a, 105a, 106a, 107a on which is deposited a dielectric layers 103b, 104b, 105b, 106b respectively. In particular the conductive layers of the priming capacitors are separated from the conductive layers of the generator capacitors, on the same disc, by the electrically isolating rings R. The dielectric layers of the priming capacitors 102, 103 are separated into alternating radially extending regions of high dielectric permittivity 115 (the crosshatched segments in the drawings) and low dielectric permittivity 116 (the clear segments). arranged to vary in phase as the plates are displaced by the transmission shaft 18 as can be discerned from FIGS. 3B and 3C as well as FIGS. 8-11.

A switch system 108 is driven synchronously with the change in capacitance induced by relative displacement of the plates 104-107. The switch system consists of three switches K1, K2 and K3 respectively. The switch K1 is arranged to electrically isolate or communicate between the plate 104 of the first priming capacitor 102 and the plate 106 of the second priming capacitor 103. The switch K2 is arranged to electrically communicate or isolate the plate 106 with the plate 105 of the first priming capacitor 102. The switch K3 is arranged to electrically communicate or isolate the plate 105 with the plate 107 of the second priming capacitor 103.

The self priming circuit may rely on the presence of at least a small residual charge on the generator capacitors 1, 2. A residual charge is one much less than the priming charge, for example 10% or 1% or 0.1%. Its actual value will depend on the conditions of operation as well as the construction of the priming capacitors. This can be ensured by careful selection of the material from which the capacitors are constructed. Preferred materials include Barium Titanate, Barium Strontium Niobate because of their high dielectric permittivity. Such materials retain at least a small electric charge indefinitely.

Other dielectric materials exist which will generate small electric charges simply by the action of friction as the opposing capacitor plates move. Friction may be caused by the action of the rotating dielectric pressing against a spacer 102a, 103a interposed between the opposing dielectric layers. This may be sufficient to initiate the self priming process described below.

Figure 8A:
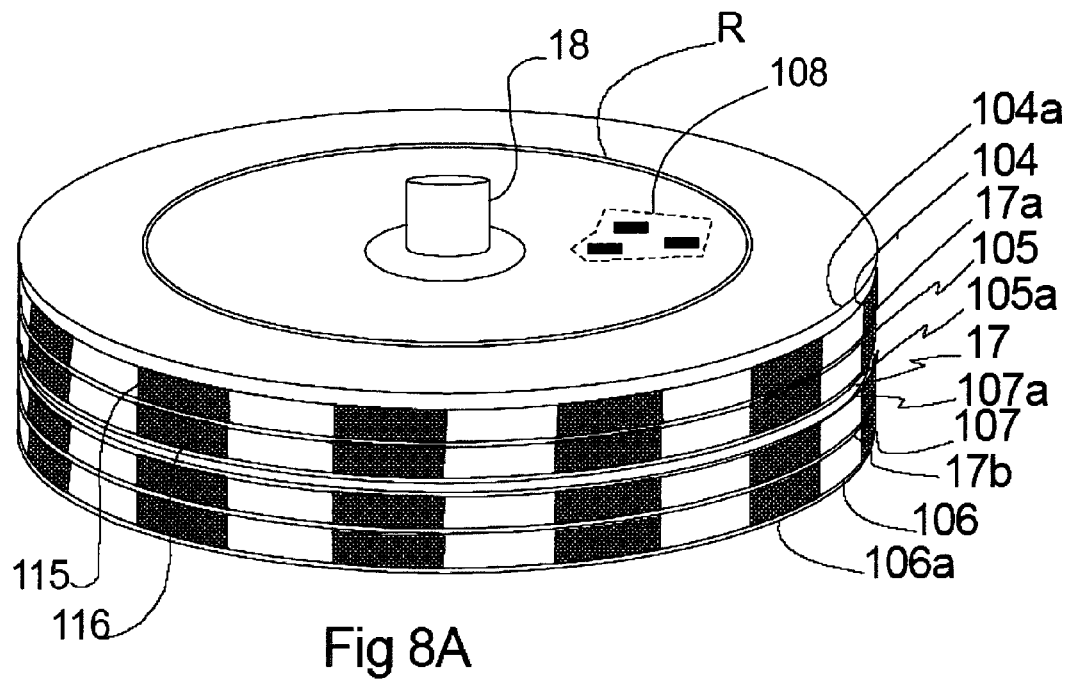
FIG. 8A is a view as for FIG. 7A illustrating a second phase switching step in the operation of the self priming circuit.

The residual charge (Q) is illustrated as being present on the generator capacitor 2 arranged to communicate with the plates 104 and 107 as shown in FIG. 1 when read with FIG. 8A. In the initial state the switches of K1, K2 and K3 are all open and there is no charge on any of the priming capacitor plates.

Figure 8B:
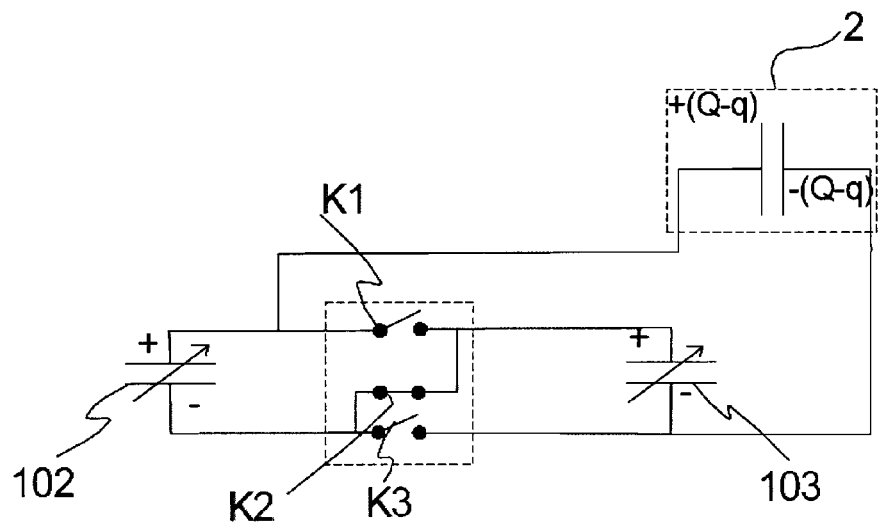
FIG. 8B is a circuit diagram illustrating the charge states of the second phase of the self priming circuit of FIG. 8A, FIG. 9A, is a view as for FIG. 7A illustrating at the priming capacitors at a third phase.

FIGS. 8A and 8B show the second phase of the self priming process where rotation of the rotor B causes the switches to set K1 and K3 open and, K2 closed the residual charge source initially communicates with the priming capacitor plates 104 and 107 raising the charge on those plates to +q and −q respectively. In consequence an equal and opposite charge is induced on the opposing plates 105, 106. It will be noted that at this stage the dielectric regions are aligned to maximum permittivity in both capacitors 102 and 103. The charge on the generator capacitor plates changes to +(Q−q) and (Q−q).

Figure 9A:
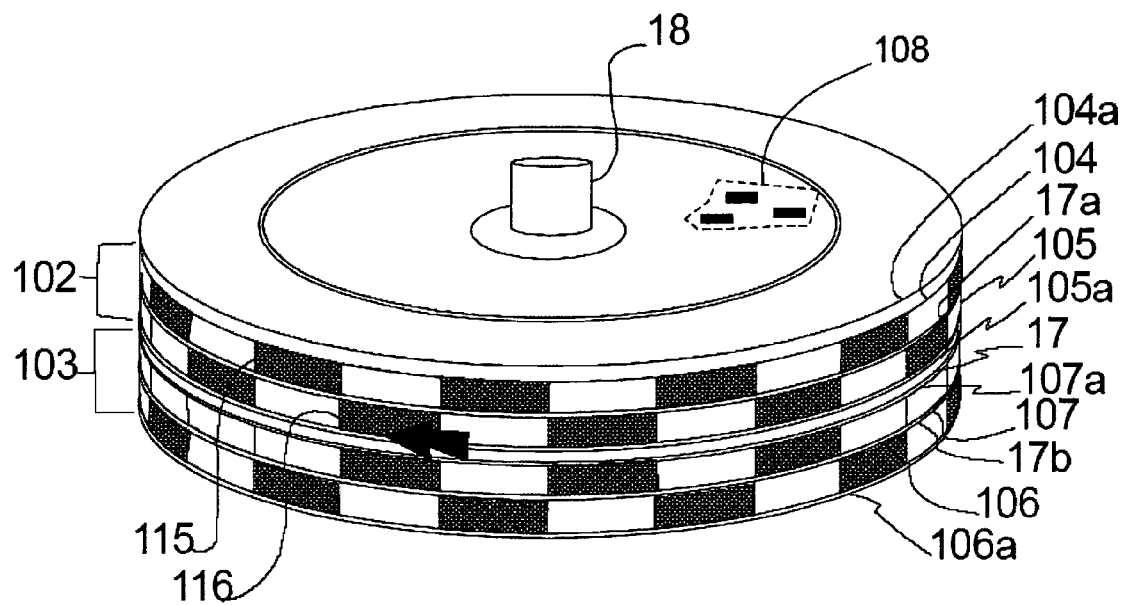
FIG. 9B is a circuit diagram illustrating the charge states of the third phase.
Figure 9B:
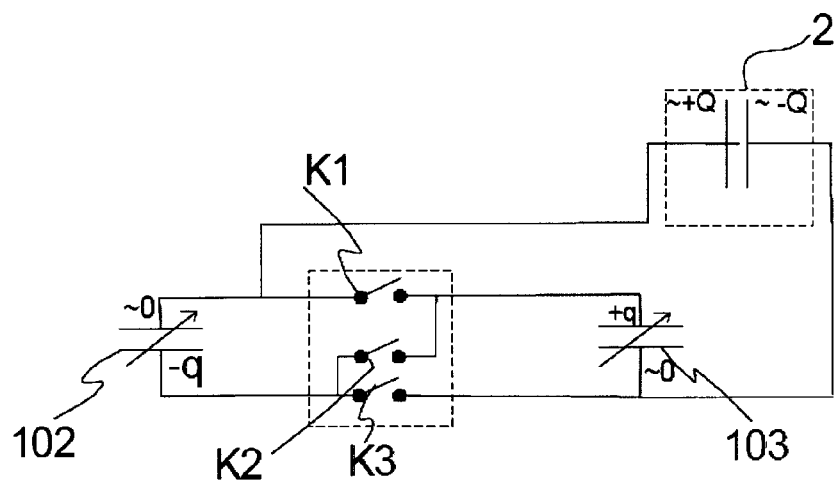

In the third phase illustrated in FIGS. 9A and 9B all the switches are open, the rotor plates 104, 106 are displaced to minimise the permittivity of the dielectric layers between the capacitors 102, 103 and so the charge on the generator capacitor 2 returns to +Q and −Q.

Figure 10A:
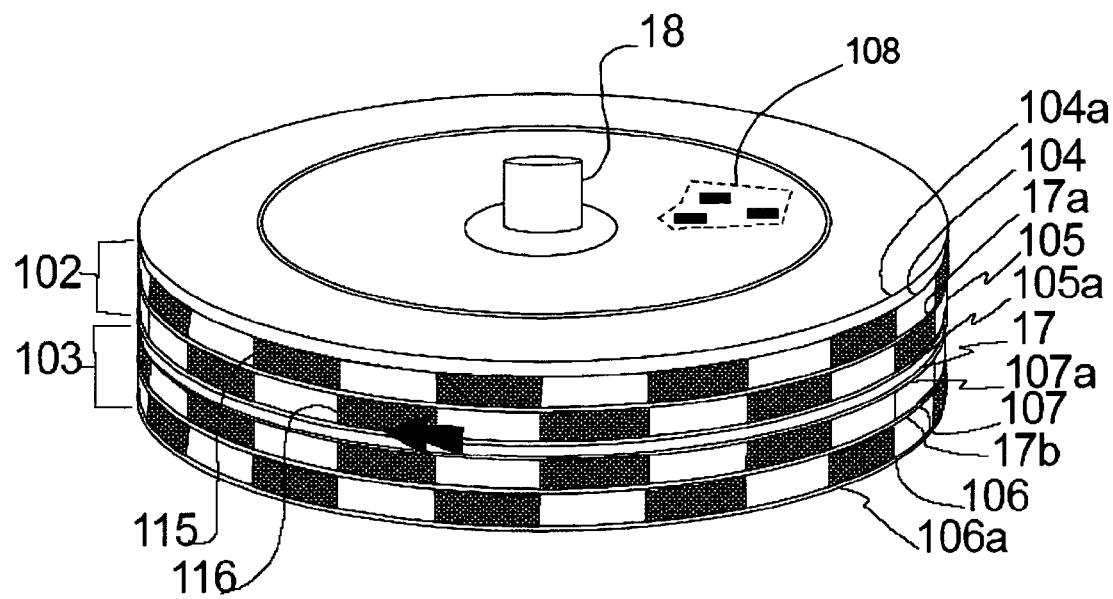
FIG. 10A is a view as for FIG. 7A illustrating a fourth phase.
Figure 10B:
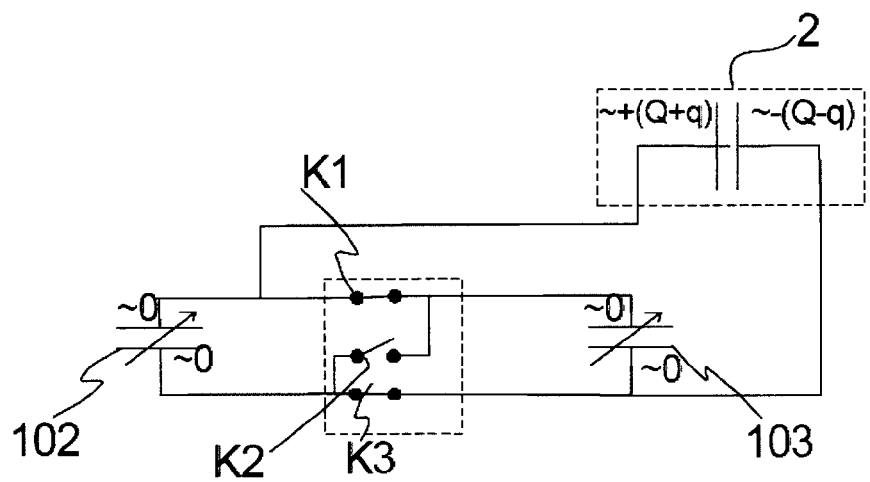
FIG. 10B is a circuit diagram showing the charge and switching states of the components of the self priming circuit in the fourth phase.

In the fourth phase illustrated by FIGS. 10A and 10B the switches K1 and K3 are closed and K2 is open to communicate the plates 104 with 106 and 105 with 107 while the dielectric layers remain aligned to produce a minimum permittivity. The result is that the charge on the generator capacitor 2 rises to Q+q. Repeating the self priming process steps by returning the self priming circuit to the first phase results in Q being set equal to Q+q for the next cycle of self priming which can be repeated indefinitely until Q reaches a maximum determined by the limiting capacity of the generator capacitors 1, 2 so amplifying the priming charge to a maximum.

As illustrated in FIGS. 2 and 3 the design of the self priming circuit can advantageously be implemented in a rotary generator by constructing the priming capacitor plates 104-107 on annuli of the same structural discs forming the generator capacitors.

The switches K1, K2, K3 may conveniently be provided on the outer surfaces of the stator discs A and C to be actuated by the rotation of the shaft relative to the stator disc. Alternatively the switches may be fabricated into the portions of the rotor and stator discs A, B, C not serving as capacitors so that the relative rotation of the rotor disc and stator discs actuates the priming circuit switches.

It will be readily apparent to the skilled person that the same effects can be achieved where the generator is implemented as linearly moving capacitor plates.

Figure 11:
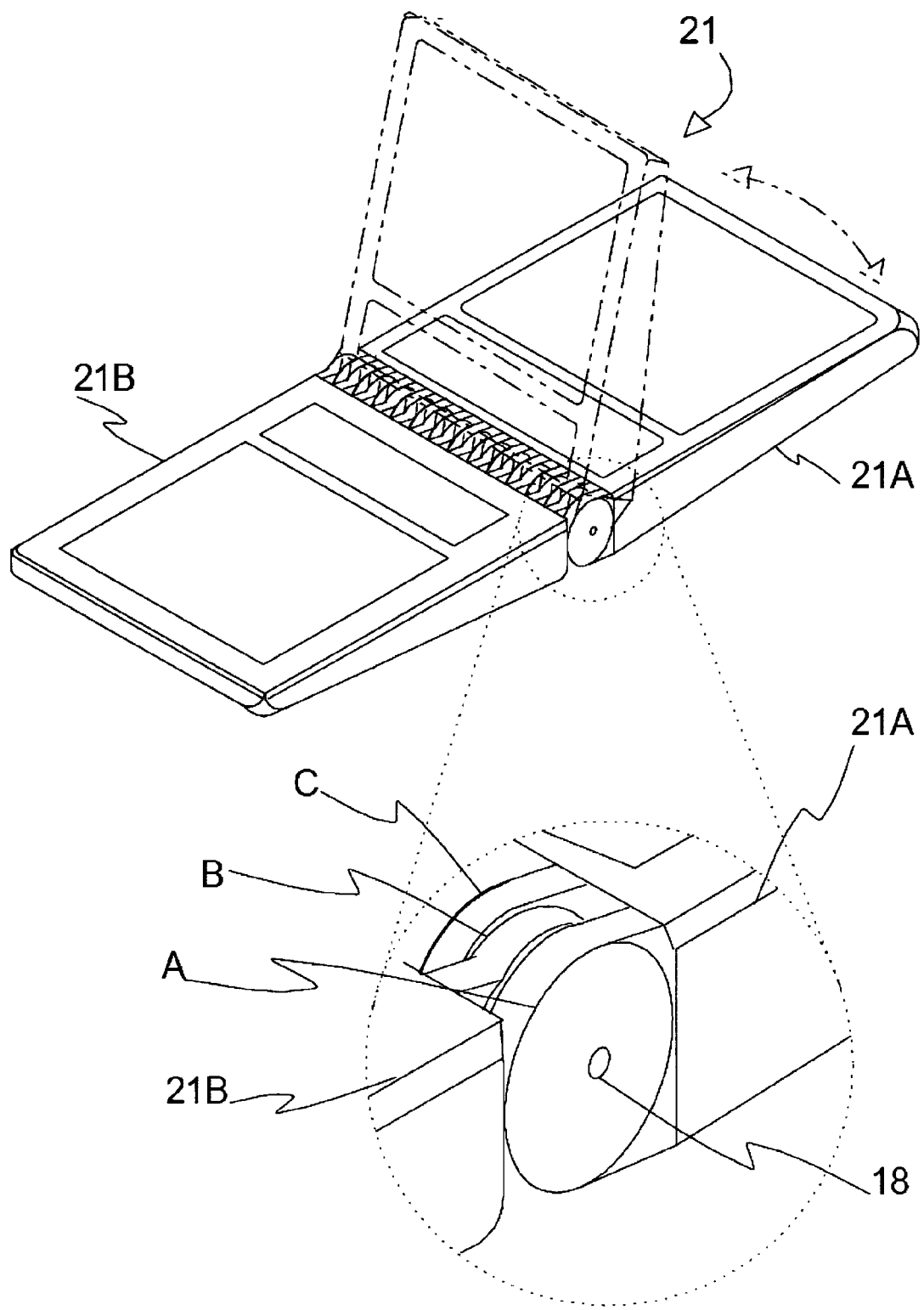
FIG. 11 is a perspective view of a flip phone with the generator of the first embodiment installed in a hinge structure.

As illustrated in FIG. 11 the discs A, B, C and shaft 18 may form part of the hinge structure coupling the parts 21A, 21B of a flip phone 21. In this application of the generator disks A and C may be mounted to the part 21A while the disc B is mounted to the part 21B, thus when the phone is flipped open the disc B rotates relative to the discs A and C. Gearing (not shown for the sake of clarity) may be provided to one of the stator discs A and C or the rotor disc B so that the action of opening the flip phone causes several relative rotations of the discs. Further the generators may be banked as shown in FIG. 11 so that a plurality of generators provide the hinge structure.

Figure 12A:
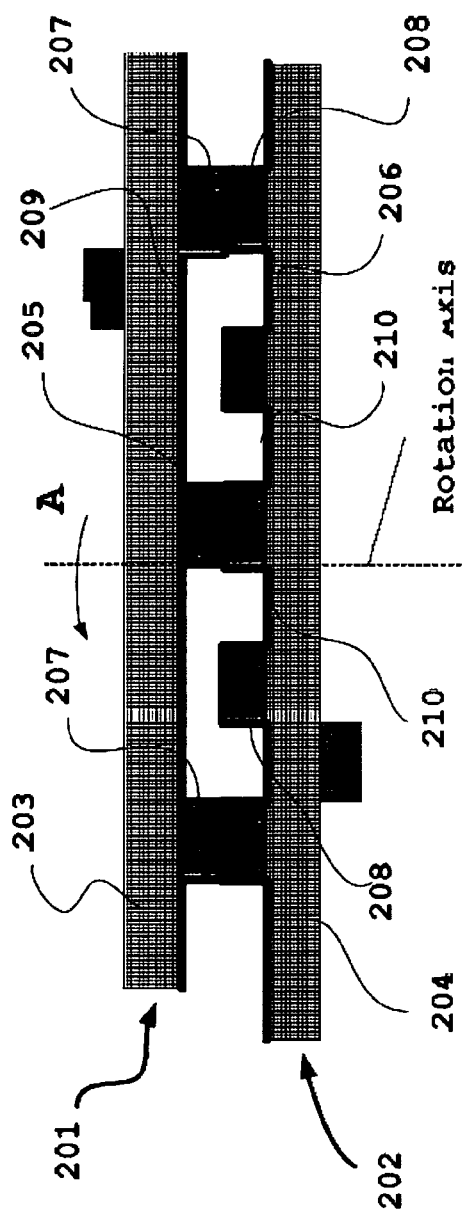
FIGS. 12A and 12B are sectional elevations through a segment of an alternative capacitor structure for use in a second embodiment of the invention.
Figure 12B:
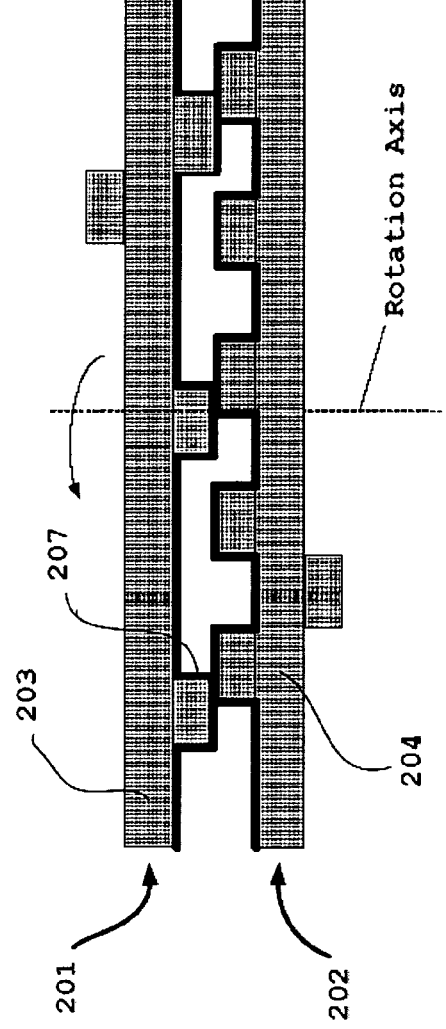

FIGS. 12A and 12B show a second embodiment of the capacitor structure for use as variable generator or priming capacitors. Each capacitor 1, 2 is similar and so only one will be described. The capacitor comprises a first mobile plate 201 and a second static plate 202. Which of the plates is movable is purely a matter of design selection, the important feature being that like the first embodiment the capacitor plates are relatively displaceable in a direction lying in a plane parallel to their confronting surfaces. The first and second plates have conductive layers 203, 204 respectively. The conductive plates 203, 204 are provided with confronting surfaces 205, 206 which are shaped as rib formations 207, 208 providing projections which are separated by adjacent troughs 209, 210 the whole of each confronting surface of 205, 206 is coated with a uniform thickness layer of Bastron to provide a dielectric layer. Bastron in this case is simply an example of a suitable material. The rib formations may be created by copper tape fastened to the conductive layer 203, 204 although more sophisticated production techniques could be used in manufacture. The plates 203, 204 are supported so that the smallest possible gap separates the proximal ends of the ribs 207, 208 when they are aligned in opposition as shown in FIG. 12A. As the mobile plate 201 is displaced in the direction of the arrow A the confronting ribs 207, 208 on the plates move from the opposed alignment shown in FIG. 12A to the adjacent alignment shown in FIG. 12B. This alters the permittivity of the dielectric between the plates so changing the capacitance of the capacitor between minimum and maximum values. It will be noted that the troughs separating the rib formations on the plate 201 are and integer multiple of the width of the troughs separating the ribs on the plate 202. In this example the integer is three.

The examples of the generator given rely on relative rotary motion of the plates which presents certain advantages in efficiency and mechanics. However, it is within the scope of this invention that the plates may be relatively reciprocally moved either rotationally or linearly.

The fabrication of the capacitors can be conveniently achieved using layer by layer laser sintering by intermittent laser impulse or one time laser sintering by a single laser impulse of one layer. Dielectrics may be deposited on to a substrate using sputtering.

Figure 13A:
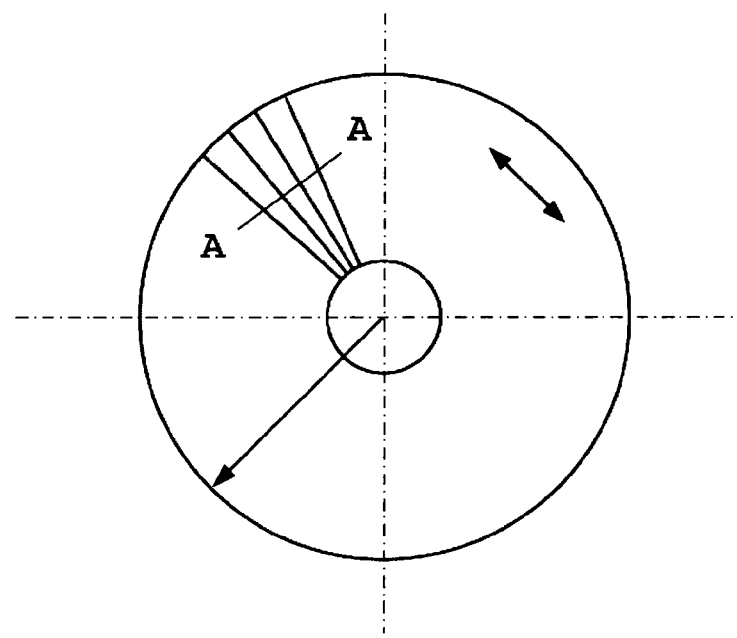
FIG. 13A is a plan view of a capacitor plate of a third embodiment of the invention
Figure 13B:
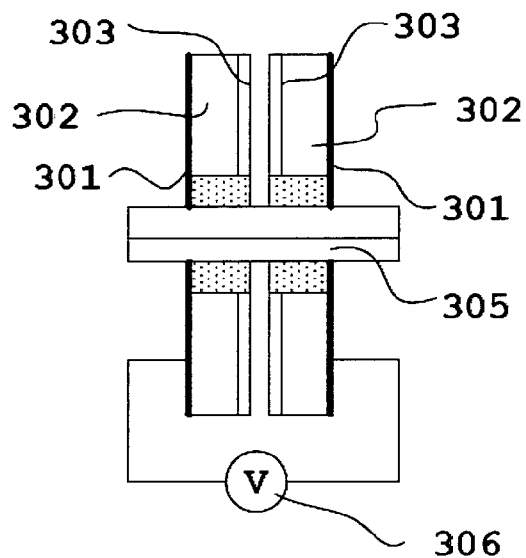
FIG. 13B is an elevation of a generator using the capacitor structure of FIG. 13A.
Figure 13C:
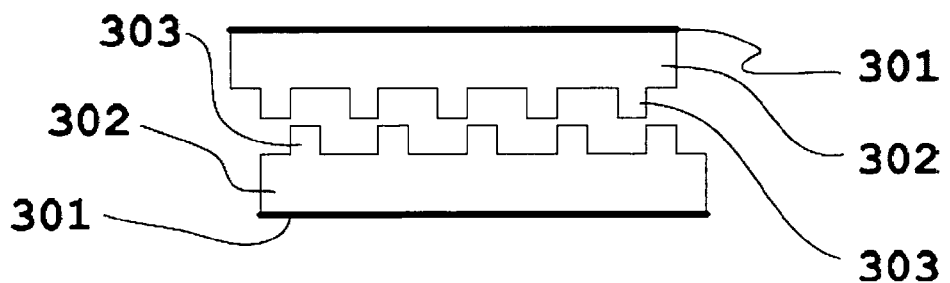
FIG. 13C is a section on the line A-A in FIG. 13A.

FIGS. 13A-13C show another embodiment of the invention. This embodiment is presented in the priority application RU2007127122/06(029591). A capacitive generator of electric current comprises two electric capacitors 301, 302 of alternating capacitance, provided that each of the capacitors has capacitance that can be changed between a minimum and a maximum, the capacitors are connected by an electric circuit; the capacitors are connected mechanically in anti-phase so that when one capacitor has minimum capacitance, the other capacitor has maximum capacitance; when the capacitors are manufactured, direct potential is applied to the electrodes of capacitors.

Each of the capacitors is formed from a ferroelectric plates 303 (electrets) the outermost surface of which is coated with a conducting layer. Opposing surfaces have tooth elements 303 the ridges of which are oriented perpendicular to the direction of relative displacement. Both electrodes can have forward movement or rotational movement one in regards to the other so that the electrodes move in a plane parallel to their major axis and the electrodes remain at a constant distance from each other. An electric circuit 306 contains elements, which provide for a regime of charge self-excitation to provide a priming charge to the generator capacitors 301, 302

When one ferroelectric plate (electrets) is rotated as regards the other, tooth elements are displaced ones as regards the others. The air gap between the plates changes from minimum value when ridges of teeth face each other to maximum value when ridges of tooth elements of one plate are above cavities of tooth elements of another plate. Such modulation of air gap brings about alteration of capacitance of the capacitor, alteration of potential difference on the electrodes. This change is registered by voltmeter 6. Rotation of ferroelectric plates (electrets) requires application of mechanical energy that is converted into electrical energy. The best embodiment of the device says that during one mechanical rotation the capacitor is charged and recharged with the frequency that is equal to the number of tooth elements covering the span of displacement of the gear.

FIG. 14 illustrates an advantage of the invention that the generator may be configured in many shapes. In this case the generator is formed from two concentric tubes. The generator comprises two axially spaced tubular generator capacitors 401, 402. These consist of an inner tube providing two axially spaced tubular generator capacitor plates 404, of which only one shows in the drawings. Opposing generator capacitor plates are provided as parts of the outer tube shown at 406 and 403. Each plate is electrically isolated from the adjacent plates by rings R.

Each inner plate 404 comprises a inner layer of conductor and each outer plate comprises an outermost layer of conductor 403a, 406a. each inner tube has an outermost layer of dielectric material, while each outer tube is provided with an inner layer of dielectric material. The layers of dielectric material are divided into longitudinally extending regions 415 of low permittivity, represented by the dark regions and high permittivity 416 represented by the light regions. As with the previous embodiments one of the layers of dielectric of one of the capacitors has the regions offset so that, when one tube is rotated relative to the other, the dielectric permittivity of one capacitor rises while that of the other falls.

A circuit similar to that described with reference to the first embodiment connects the two described generator capacitors so that a charge loaded onto the capacitors will travel back and forth between them when one tube is rotated relative to the next.

Priming capacitors 402', 403 are provided by similar tubular capacitors provided by outer and inner layers of conductor 404a, 405a on which are provided, respectively confronting layers of dielectric 404, 405 at the axial ends of the generator. The layers of dielectric material are provided with regions of high and low dielectric permittivity which extend longitudinally and are radially alternated. As with previous examples of the priming capacitors these regions are similarly arranged in each priming capacitor so that the capacitance thereof changes in phase. The priming capacitors 402', 403 are connected in a priming circuit 101 as described for the first embodiment.

The invention claimed is:

1. A capacitive electric current generator comprising:
a capacitive generating circuit (G) arranged to be responsive to a mechanical force from a transmission to generate an electric current; and
a priming charge circuit (P) comprising priming capacitors (102, 103) mechanically coupled to the transmission to vary their capacitance and electrically connected to the capacitive generating circuit (G) to generate and deliver a priming charge to the capacitive generating circuit (G) in response to the mechanical force; wherein the priming charge circuit (P) comprises a first variable capacitor (102) in circuit with the second variable capacitor (103) and an array of switches arranged for synchronous and sequential actuation by the mechanical transmission; and wherein the capacity of the priming capacitors (102, 103) is arranged to vary in phase in response to movement by the transmission and the switches (K) are arranged to open and close between the plates of the priming capacitors so that:

in a first position of the transmission an initial charge on the priming capacitors (102, 103) is equally dispersed between the priming capacitor plates (104, 105, 106, 107), with the capacitance of the priming capacitors (102, 103) at a minimum; and in response to movement of the transmission to a second position the switches are arranged to open to isolate the capacitor plates (104, 105, 106, 107) from each other and the capacitance of the capacitor plates will be caused to simultaneously rise to maximum whereby a relatively small positive charge is isolated on one plate (106) of one priming capacitor and a negative charge (−q) on one plate of the other priming capacitor (105) while the remaining plates are substantially neutrally charged while in communication with the generator circuit (1); and further movement by the transmission (18) to a third position connects each charge bearing plate (105, 106) of the respective neutrally charged plates (104, 107) of the other of the capacitors, whereby the charge on the generator capacitor circuit (1) is increased, and further movement of the transmission to return to the first position with the increased charge acting as the initial charge.

2. A capacitive electric current generator comprising:

a capacitive generating circuit (G) arranged to be responsive to a mechanical force from a transmission to generate an electric current; and a priming charge circuit (P) comprising priming capacitors (102, 103) mechanically coupled to the transmission to vary their capacitance and electrically connected to the capacitive generating circuit (G) to generate and deliver a priming charge to the capacitive generating circuit (G) in response to the mechanical force; and wherein the priming charge circuit (P) comprises a first variable capacitor (102) in circuit with the second variable capacitor (103) and an array of switches arranged for synchronous and sequential actuation by the mechanical transmission; and wherein the variable priming capacitors (102, 103) vary their capacity by varying the permittivity of the dielectric between the capacitor plates, and wherein each capacitor (102, 103) has a movable plate and stator plate each plate (104, 105, 106, 107) being provided with dielectric layer arranged in opposition, said dielectric layers having regions of high dielectric permittivity (15) and relatively low dielectric permittivity (16) arranged so that as one plate moves relative to the other the regions of high dielectric permittivity on respective opposing dielectric layers coincide and the regions of low dielectric permittivity coincide to minimise the capacitance of the capacitor and, upon displacement by the transmission, the regions of low dielectric permittivity (15) coincide with regions of high dielectric permittivity (16) to maximise the capacitance of the priming capacitor.

3. A capacitive electric current generator comprising:

a capacitive generating circuit (G) arranged to be responsive to a mechanical force from a transmission to generate an electric current; and a priming charge circuit (P) comprising priming capacitors (102, 103) mechanically coupled to the transmission to vary their capacitance and electrically connected to the capacitive generating circuit (G) to generate and deliver a priming charge to the capacitive generating circuit (G) in response to the mechanical force; and wherein the priming charge circuit (P) comprises a first variable capacitor (102) in circuit with the second variable capacitor (103) and an array of switches arranged for synchronous and sequential actuation by the mechanical transmission; and wherein the generator circuit has: a variable first capacitor (1) and a variable second capacitor (2), each of said capacitors (1, 2) comprise a pair of conductive layers (9, 10, 11, 12) separated by a dielectric, an electrical energy extraction device (8) electrically communicating between a conductor layer (9) of one capacitor plate (5) of one of said variable capacitors (1) and a conductive layers (10) of the other of said capacitors (2), a mechanical transmission coupled to each capacitor (1, 2) to synchronously vary the capacity (1, 2) of each capacitor, in antiphase, in response to a mechanical impulse from an external source, without changing the distance between the conductive layers, whereby, when a priming electric charge is stored on the capacitors (1, 2) the priming charge is conducted through the electrical energy extraction device (8) to extract electrical energy.

4. A generator wherein: a variable first capacitor (1) and a variable second capacitor (2), each of said capacitors (1, 2) comprise a pair of conductive layers (9, 10, 11, 12) separated by a dielectric, an electrical energy extraction device (8) connected between a conductor layer (9) of one capacitor plate (5) of one of said variable capacitors (1) and a conductive layers (10) of the other of said capacitors (2), a mechanical transmission (18) coupled to each capacitor (1, 2) to vary the capacity (1, 2) of each capacitor, in response to a mechanical force from an external source, so that as one capacitance increases the other decreases, without changing the distance between the conductive layers, whereby, when a priming electric charge is stored on the capacitors (1, 2) the priming charge is conducted through the electrical energy extraction device (8) to extract electrical energy.

5. A generator according to claim 4 wherein: the mechanical transmission (18) varies the permittivity of the dielectric between the conductive layers (9, 10, 11, 12) of each capacitor (1, 2) in so that the capacitance of each capacitor (1, 2) varies in phase with the dielectric permittivity.

6. A generator according to claim 5, wherein: each conductive layer (9, 10, 11, 12) supports a respective dielectric layer (13, 13a, 14, 14a) to form a capacitor plate (3, 4, 5, 6), said first capacitor (1) being formed of a pair of said plates (3, 5) and said second capacitor (2) being formed of a second pair of said plates (4, 6), each dielectric layer (13, 13a, 14, 14a) having high dielectric regions (15) formed of a dielectric of high permittivity separated by low dielectric regions (16) of a dielectric of a permittivity which is low relative to the high permittivity dielectric region, each of said capacitors (1, 2) being formed of a pair of said plates (3, 4, 5, 6) with the dielectric layers (13, 13a, 14, 14a) in opposing relation between the conductive layers (9, 10, 11, 12) and, said mechanical transmission moving one of the dielectric layers (13, 13a, 14, 14a) of each capacitor (1, 2) in a direction lying in a plane parallel to the plate, so that the changing coincidence of the high dielectric regions (15) and low dielectric regions (16) effects the change in capacitance.

7. A generator according to claim 6 wherein one of the plates of each capacitor is a mobile plate (3, 4) to be movable relative to the other, stator plate (5, 6) of each capacitor, and said mechanical transmission is coupled to displace the mobile plates (3, 4) to effect the displacement of the dielectric layer (12, 13) of each said mobile plate (3, 4), relative to the respective dielectric layers (11, 14) of said stator plates (5, 6).

8. A generator according to claim 7 wherein the mobile plates (3, 4) of the generator are mounted in back-to-back relation on a common armature.

9. A generator according to either of claim 6 wherein the facing surfaces of the opposing dielectric layers (11, 12, 13, 14) are flat to enhance the energy density of the generator.

10. A generator according to claim 9 wherein the facing surfaces are polished.

11. A generator according to claim 9 wherein the mechanical transmission reciprocates the mobile plates (3, 4).

12. A generator according to claim 6 wherein the mobile plate is a rotor.

13. A generator according to claim 12 wherein the plates (3, 4, 5, 6) are disks.

14. A generator according to claim 6 wherein the regions are strips.

15. A generator according to claim 14 wherein the priming charge circuit (P) comprises a first variable capacitor (102) in circuit with the second variable capacitor (103) and an array of switches arranged for synchronous and sequential actuation by the mechanical transmission, wherein the strips extend radially.

16. A generator wherein: a variable first capacitor (1) and a variable second capacitor (2), each comprise a mobile plate and a stator plate, each plate comprises a conductive layer (9, 10, 11, 12) and a dielectric layer lying between the confronting faces of the plates, one of the conductive layers (9, 12) of each of said capacitors (1, 2) is electrically connected via a conductor (7) which includes an electrical energy extraction device, each capacitor (1, 2) is coupled to a mechanical transmission which varies the capacity (1, 2) of each capacitor, in response to a motivating mechanical force from an external source, by moving the mobile plates of each capacitor (1, 2) relative to the stator plates whereby, when a priming electric charge is stored on the capacitors (1, 2) the priming charge is conveyed through a conductor (7) to drive the electrical energy extraction device to extract electrical energy characterized in that the confronting surfaces of the conductive layers of each capacitor (1, 2) are shaped so that the dielectric between the plates varies to change the capacitance when the mobile plate is moved with respect to the stator plate.

17. A generator according to claim 16 wherein the plates are shaped in the form of corrugations.

18. A generator according to claim 17 wherein the corrugations have a rectangular section so that opposing ribs of the corrugations present flat complementary opposing surfaces of similar width in the direction of relative movement.

19. A generator according to claim 18 wherein, on one of the opposing plates channels separating the ribs have a width similar to the width of each rib while on the other of the opposing plates the channels separating the ribs have a width an integer multiple of the width of each rib.

* * * * *